United States Patent [19]

Endo et al.

[11] Patent Number: 6,142,510
[45] Date of Patent: Nov. 7, 2000

[54] STEERING WHEEL FOR A VEHICLE

[75] Inventors: Tetsuji Endo; Kazuhiro Kaneko, both of Fuji, Japan

[73] Assignee: Nihon Plast Co., Inc., Japan

[21] Appl. No.: 09/357,254

[22] Filed: Jul. 20, 1999

[30] Foreign Application Priority Data

Jul. 22, 1998 [JP] Japan .................................. 10-206661

[51] Int. Cl.[7] .................................................. B60R 21/22
[52] U.S. Cl. ...................................... 280/731; 280/728.3
[58] Field of Search ................................ 280/731, 728.3, 280/728.1

[56] References Cited

U.S. PATENT DOCUMENTS

| 4,995,638 | 2/1991 | Shinto et al. ........................... 280/731 |
| 5,449,196 | 9/1995 | Ohno et al. ........................... 280/728.3 |
| 5,560,648 | 10/1996 | Rhule et al. ............................. 280/731 |
| 5,605,350 | 2/1997 | Bates et al. ........................... 280/743.1 |
| 5,730,460 | 3/1998 | Niederman ............................... 280/731 |
| 5,893,581 | 4/1999 | Niederman ............................... 280/731 |

*Primary Examiner*—Eric Culbreth
*Attorney, Agent, or Firm*—Kilpatrick Stockton LLP

[57] ABSTRACT

A steering wheel includes a boss, a spoke, and an air bag apparatus with a bag and a synthetic resin cover. When the vehicle is subjected to a collision, the bag is inflated and rupture opens a front wall of the cover. The front wall has two side rupture lines, a dividing rupture line between the side rupture lines, a center rupture line from the dividing rupture line, and two upper hinges between the side rupture lines and the center rupture line. When the cover ruptures open, the rupture lines rupture, causing each lid to bend and swing about the upper hinges. The dividing rupture line is disposed at a position so that the upper lids do not interfere with the rim.

10 Claims, 9 Drawing Sheets

6,142,510

STEERING WHEEL FOR A VEHICLE

BACKGROUND OF THE INVENTION

1. Field of the Invention

The present invention relates to a steering wheel for a vehicle, and more particularly to a steering wheel that has an air bag apparatus for the purpose of protecting to the face of a person sitting in a seat in a vehicle.

2. Description of the Related Art

In general, an air bag apparatus that is provided in a vehicular steering wheel has an air bag that is folded up and a cover that covers the air bag. In order to protect a person riding in the vehicle when a collision occurs, the bag is inflated by gas so as to cause the cover to rupture open. Related art can be found in the Japanese Patent Application Laid-Open Publication H7-32964.

In the above-noted related technology, however, there is a risk that the ruptured cover will interfere with the chin of the vehicle occupant.

SUMMARY OF THE INVENTION

Accordingly, it is an object of the present invention to improve on the above-noted drawback in the related art, by providing a steering wheel for a vehicle which prevents interference by the ruptured cover with the chin of the vehicle occupant.

In order to achieve the above-noted object, a steering wheel for a vehicle according to the present invention includes a boss, a rim, a spoke, and an air bag apparatus. The boss supports the steering shaft. The spoke joins the boss to the rim. The air bag apparatus is supported by the boss, and has a bag, which is folded up and stored therein, and a synthetic resin cover, which covers the bag. When the vehicle is subjected to a collision, to support the occupant, gas is used to inflate the bag, so as to rupture the cover open. The cover includes a side wall that surrounds the periphery of the bag and a front wall that covers the side of the inflation direction of the bag. The front wall has two side rupture lines, on the left and right, a dividing rupture line that joins the two side rupture lines, a center rupture line that extends upwards from the approximate center of the dividing rupture line, and two upper hinges. The two upper hinges are disposed between the side rupture lines and the center rupture line. The side rupture lines, the dividing rupture line, the center rupture line, and the upper hinges define two upper lids at two locations. When the cover ruptures open, the side rupture lines, dividing rupture line, and center rupture line rupture, causing each lid to bend and swing about the upper hinge as a moving axis. The dividing rupture line is disposed at a position so that the upper lids do not interfere with the rim.

According to the above-described arrangement, when the bag inflates so as to cause the rupture of the rupture lines of the cover, the lids swing about the upper hinges, so as to permit the bag to deploy outside the cover. When this happens, the upper lids quickly move to a position that is more toward the front of the vehicle than the rim, without interfering with the rim. The result is the elimination of the risk that the upper lids will interfere with the chin of an occupant.

Because the lids in this case do not hinder the movement of the bag, when the bag flexes in response to the force of movement of the occupant, movement of the bag itself is permitted, this movement acting to softly cushion the occupant. That is, the bag softens the shock to which the occupant is subjected.

In the present invention, the upper hinges can be mutually joined adjacent to the end of the center rupture line, and can also mutually cross at an angle of less than 180°. It is also possible for each of the upper hinges to cross with the center rupture line at an angle of approximately 90°.

The upper hinges can form a broken straight line, and can also be mutually separated.

The dividing rupture line can have a center part that is expanded toward the upper hinges, and the center rupture line can have two end parts that extend toward the upper hinges.

DESCRIPTION OF THE PREFERRED EMBODIMENTS

Figure 1:
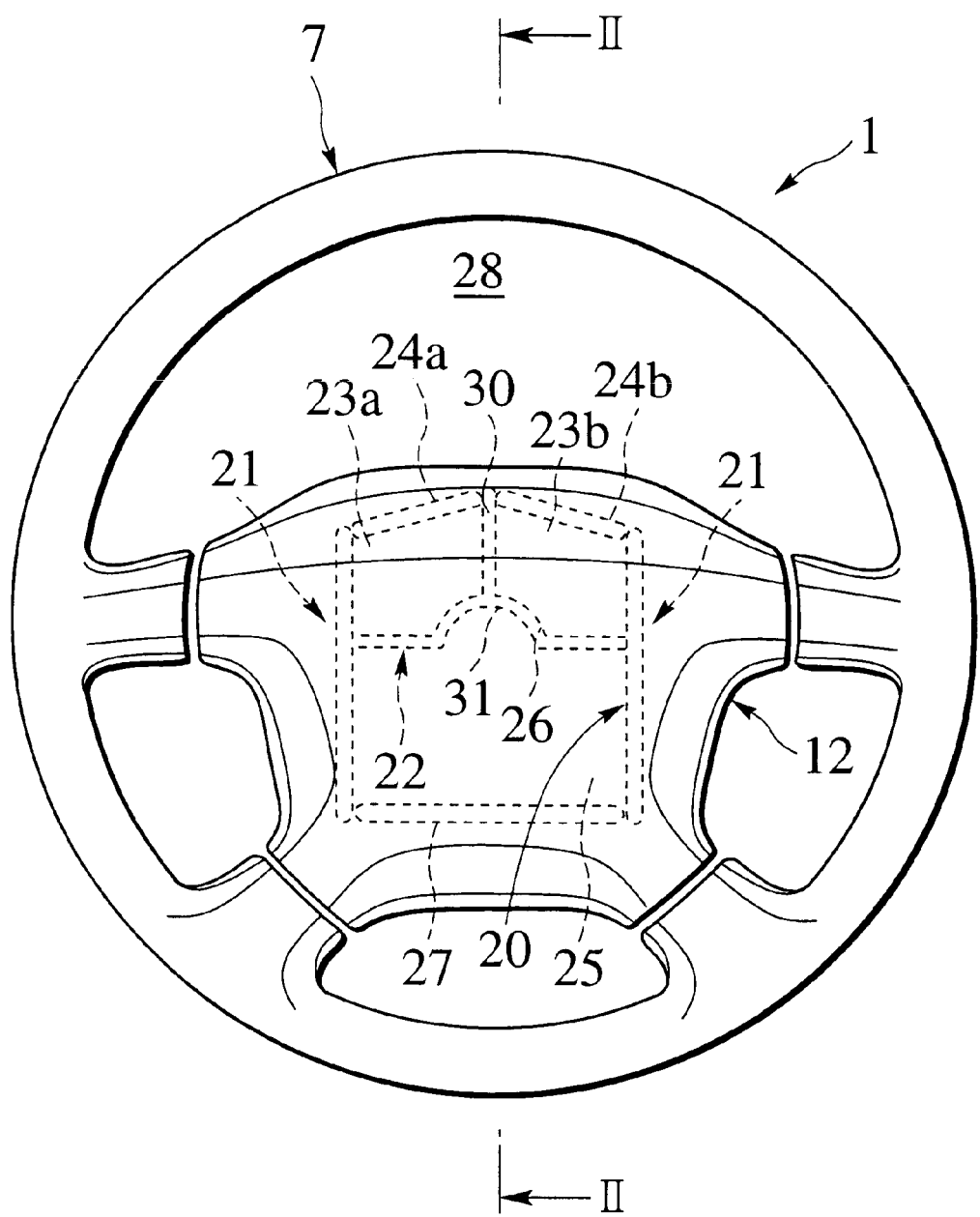
FIG. 1 is a front view that shows the first embodiment of a steering wheel according to the present invention.

Preferred embodiments of the present invention are described in detail below, with references being made to relevant accompanying drawings, in which common elements have been assigned the same reference numerals and descriptions of common elements have not been repeated.

Figure 2:
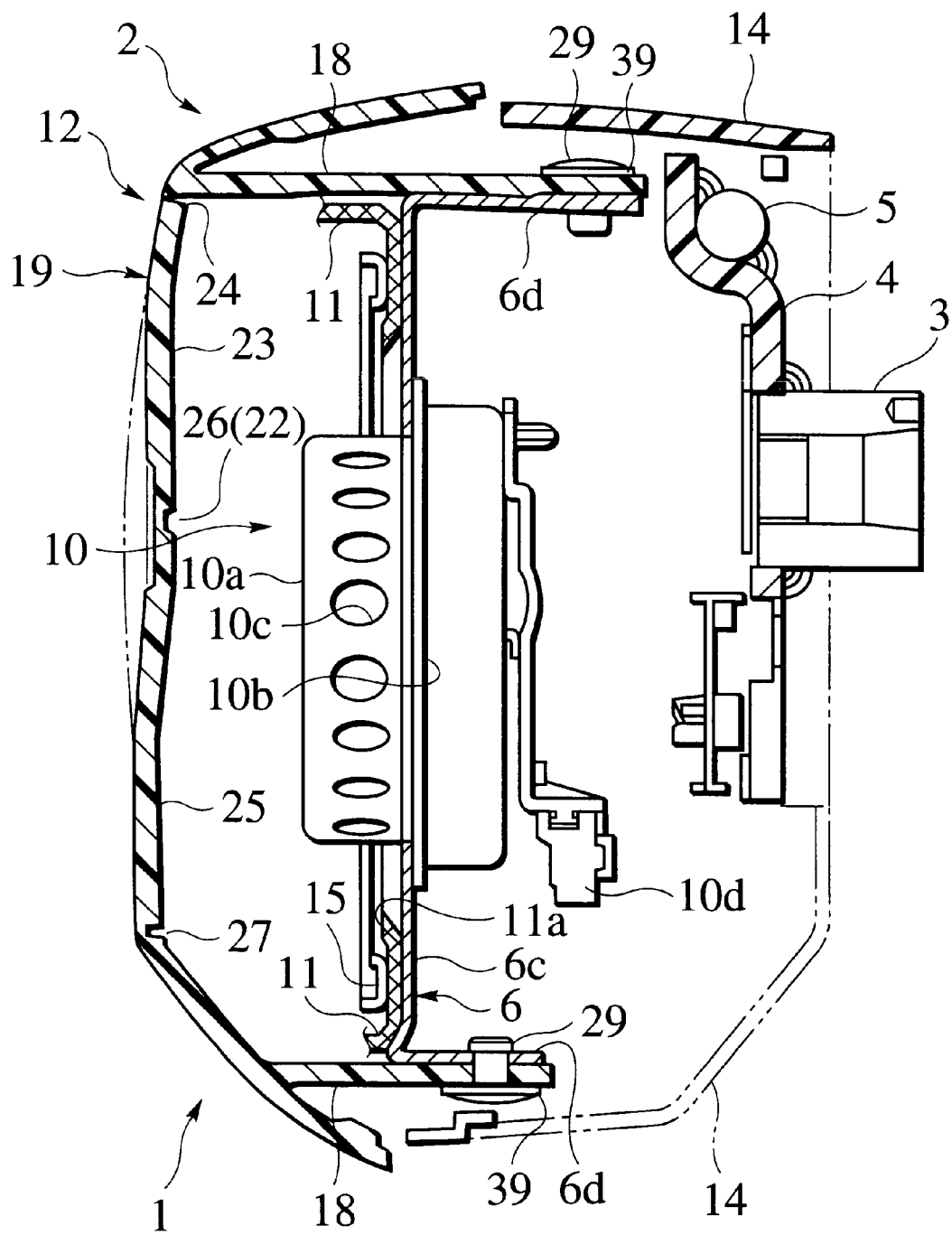
FIG. 2 is a cross-sectional view along the cutting line II—II that is shown in FIG. 1.
Figure 3:
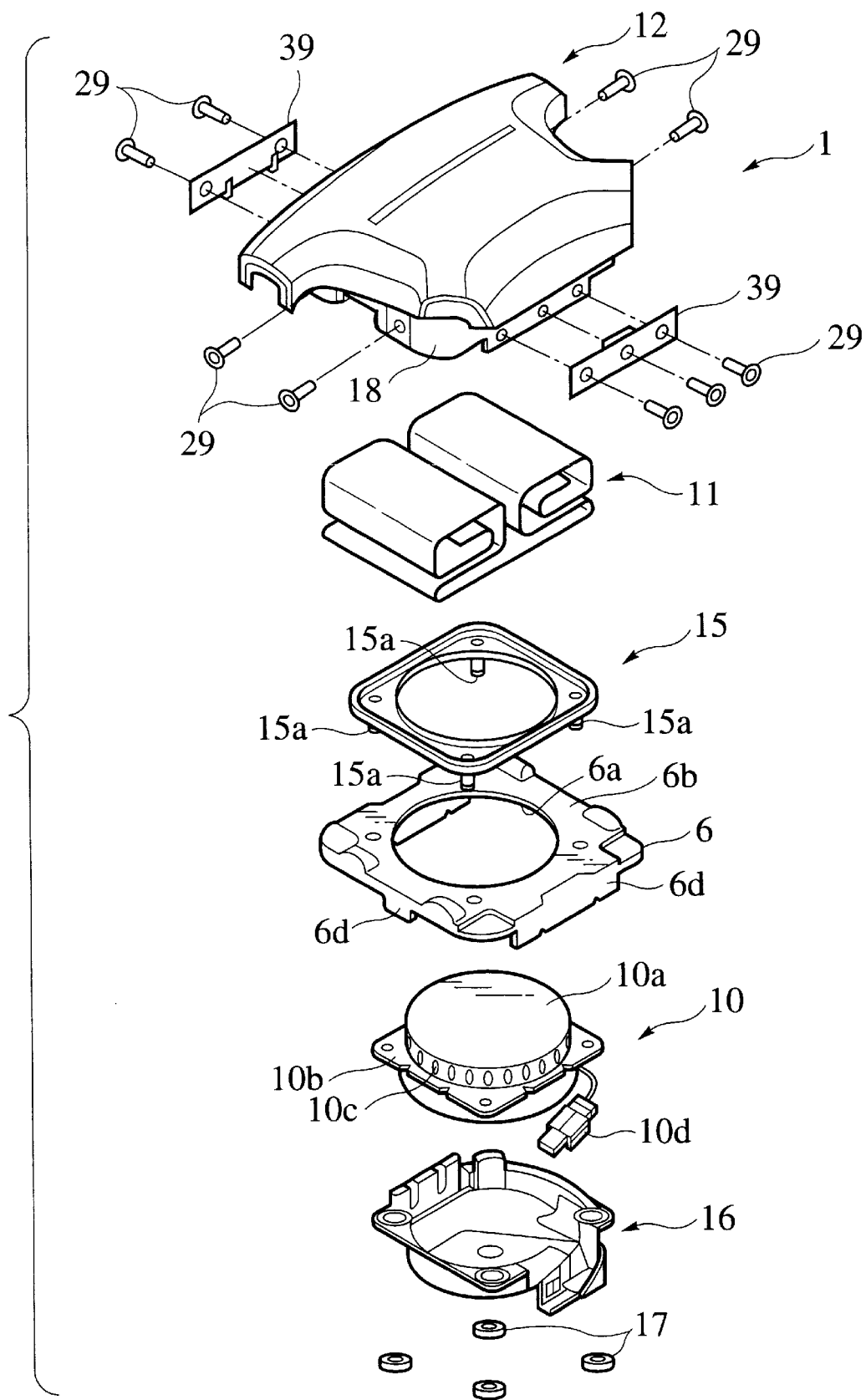
FIG. 3 is an exploded perspective view of the air bag device of FIG. 1.
Figure 4:
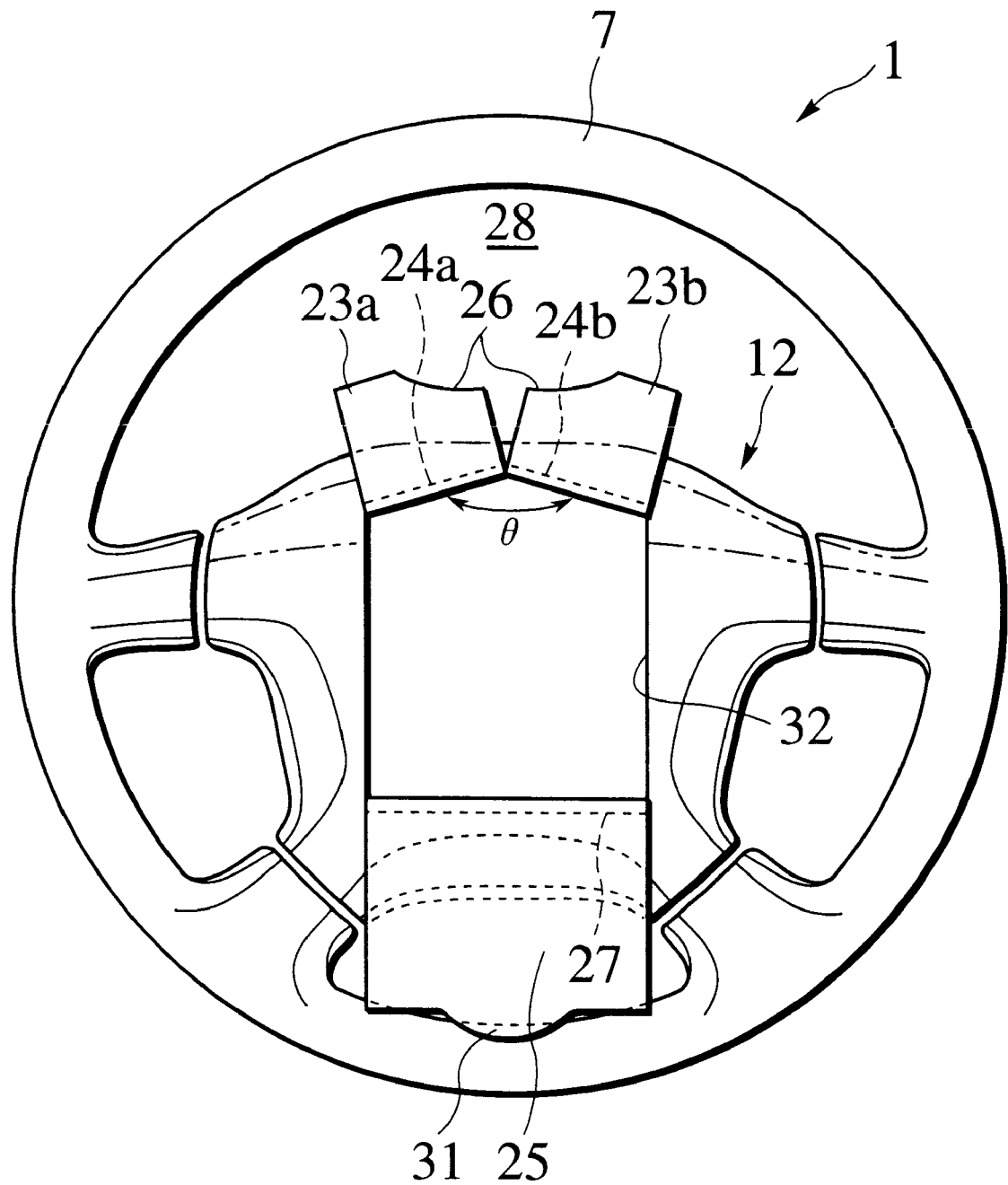
FIG. 4 is a front view showing the condition in which the upper and lower lids of FIG. 1 are open.

FIG. 1 through FIG. 4 show the first embodiment of the present invention, FIG. 1 being a front view of a steering wheel 1. FIG. 2 is a cross-sectional view along the cutting line II—II that is shown in FIG. 1, this drawing shows an air bag apparatus 2. FIG. 3 is an exploded perspective view that shows a steering wheel and an air bag apparatus that is mounted in the steering wheel. FIG. 4 is a front view that shows the steering wheel of FIG. 1 with the cover open.

The steering wheel 1 minimally has a boss 3, which is supported by a steering shaft (not shown in the drawing), a metal spoke core 5, which the boss 3 supports via a plate 4, a base plate 6, which is supported on the boss plate 4 by a known support means, an air bag apparatus 2, which is supported on the base plate 6 via a retainer 15, which is described below, and a rim 7, in the form of a closed loop, which is disposed via the metal spoke core 5. The boss section of the present invention is formed by the boss 3, the boss plate 4, and the base plate 6.

The air bag apparatus 2 is formed by an inflator 10, a bag 11, a cover 12, and a rear cover 14.

The inflator 10 is formed by a main element 10a, which is inserted into an aperture 6a of the base plate 6, and a flange 10b that is supported together with the bag 11 to the bottom surface 6c of the base plate 6 by a stud bolt 15a and nut 17, to be described below.

The main element 10a has jetting holes 10c which eject a gas G that is generated when an explosive (not shown in the drawing) is ignited. The jetting holes 10c are disposed in positions that are opposite the inside of the bag 11.

A connector 10d, which is shown in FIG. 2 and FIG. 3, is electrically connected to a shock sensor and air bag controller, which are not shown in the drawing. A synthetic resin inflator cover 16 covers the bottom side of the inflator 10 in the case in which the jetting holes 10c are at the top. The inflator cover 16 is supported by a stud bolt 15a of retainer 15 and the threaded mating of the stud bolt 15a with the nut 17.

The bag 11 is formed by a base cloth of Nylon 6,6, which is the standard specification with regard to heat resistance and pressure resistance, onto which is coated silicone, or an aramid fiber fabric, a carbon fiber fabric or the like, which is formed into the shape of a bag.

The bag 11, as shown in FIG. 3, is normally in a folded up condition. As shown in FIG. 3, the stud bolt 15a is passed through a gas intake port 11a of the bag 11, the gas intake port 11a being fixed to the base plate 6 by the threaded mating of the stud bolt 15a with the nut 17. In this condition, the retainer 15 presses up against the upper surface 6b of the base plate 6.

The gas intake port 11a is disposed so as to oppose a gas jetting hole 10c, the gas G that is jetted from the gas jetting holes 10c of the inflator 10 flowing into the gas intake port 11a. The effect of the gas G being caught within the bag 11 is to inflate the bag 11, thereby enabling the holding of a vehicle occupant. The reverse surface of the bag 11, that is, the side that is not opposite the vehicle occupant, has formed in it a vent hole that enables the exhausting of the gas G that had been caught within the bag 11.

The cover 12 is of a construction that holds and covers the bag 11, and further which enables the cover to be ruptured open when the bag 11 inflates. The cover 12 is made of a synthetic resin such as a urethane foam.

The cover 12 has a side wall 18 that covers the periphery of the bag 11, and a front wall that covers the side of the inflation direction of the bag 11.

The front wall has a rupturing part 20 that enables the deployment of the bag 11 by rupturing in response to the inflation force of the bag 11.

This rupturing part 20, as shown in FIG. 1, has two side rupture lines 21, separated to the left and right, which extend upward and downward, a dividing rupture line that joins the two side rupture lines 21, and a center rupture line 30 that extends upward from the approximate center of the dividing rupture line. The side rupture lines 21 and the dividing rupture line 22 form an approximate H shape.

The position in which the dividing rupture line 22 is formed, as shown in FIG. 1, is a position that does not interfere with the rim 7 when upper lids 23a and 23b,which are formed by the dividing rupture line 22, are impelled so as to swing about their respective hinges 24a and 24b as shown in FIG. 4.

The upper lids 23a and 23b have a vertical dimension that is smaller than a lower lid 25, which is formed separately by the dividing rupture line 22.

At the left-to-right center position of the dividing rupture line 22 of the upper lids 23a and 23b, that is, at the position corresponding to the bottom side of the center rupture line 30 between the left upper lid 23a and the right upper lid 23b, a open part 26 (shown as a protrusion in the orientation of FIG. 1) is provided, this having a size that enables avoidance of the face Ma of the occupant M (refer to FIG. 5) when the upper lids 23a and 23b swing open about the upper hinges 24a and 24b, respectively. As shown in FIG. 4, the open parts 26 are formed as to be at the center of the upper edge of the upper lids 23a and 23b after the lids 23a and 23b open, a protrusion 31 corresponding to the open part 26 being formed in the lower lid 25 after opening.

The upper hinges 24a and 24b of the upper lids 23a and 23b are formed continuously, so that the angle $\theta$ that is formed between the line of the left hinge 24a and the line of the right hinge 24b is approximately 180°, and preferably this is an angle less than and close to 180° (160° in the case of this embodiment).

The side wall 18 of the cover 12, as shown in FIG. 2 and FIG. 3, has a reinforcing plate 39, this being fixed thereto by rivets 29. For this reason, even if the inflation force of the bag 11 of the air bag apparatus 2 is applied to the side wall 18, there is almost no deformation.

Next, turning to FIG. 4 through FIG. 7, the deployment of the air bag 11 of the steering wheel and air bag apparatus 2 of the present invention and the relationship to the vehicle occupant will be described.

Figure 5:
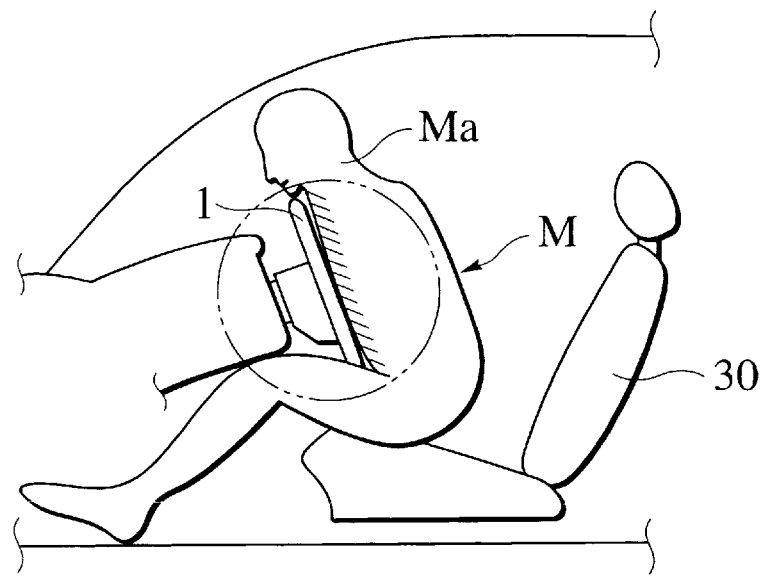
FIG. 5 is a side view that shows the relationship between the steering wheel of FIG. 1 and an occupant.
Figure 6:
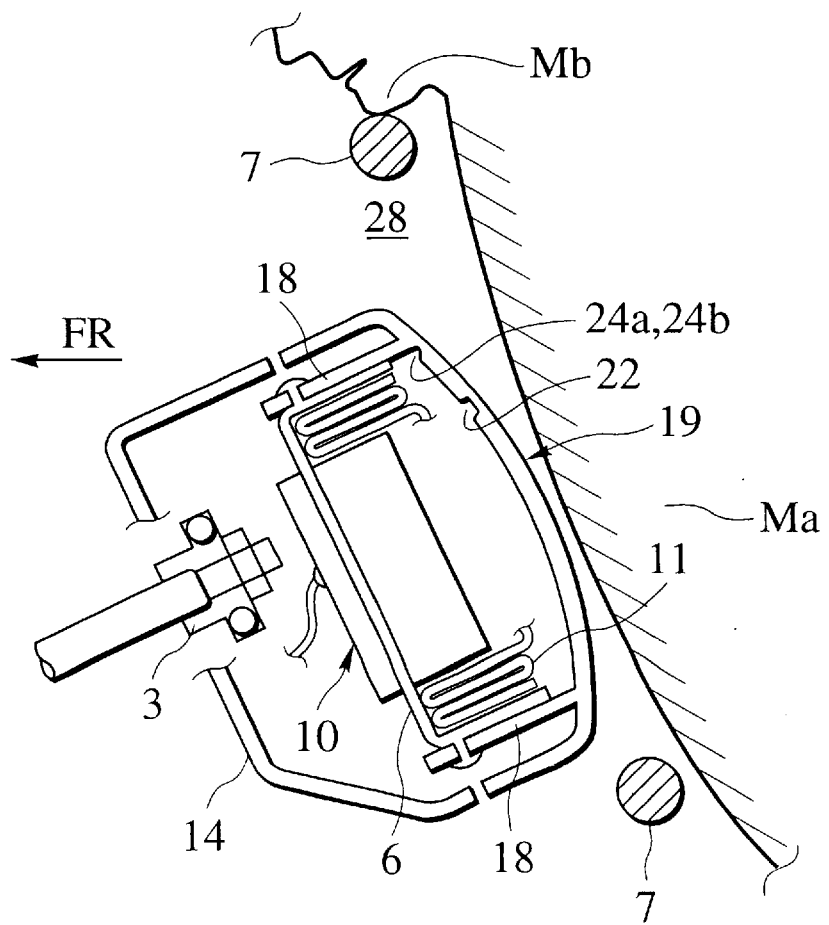
FIG. 6 is an enlarged side view of FIG. 5.

As shown in FIG. 5, when an occupant, and particularly the driver, of a vehicle is seated in the seat 30 and is in proximity to the steering wheel 1, the upper body Ma, and the chest in particular, of the occupant covers the entire rim 7 of the steering wheel 1, as shown in FIG. 6.

In this condition, if a sudden deceleration occurs, such as when the vehicle has a frontal collision, based on a signal from a shock sensor, an explosive inside the inflator 10 is set off, causing a high-pressure gas G to be jetted quickly from the jetting holes 10c.

This propelled gas G first enters the bag 11 from the intake port 11a thereof, causing the bag 11 to inflate. When the bag 11 inflates, the force of inflation of the bag 11 is applied to the side rupture lines 21, the dividing rupture line 22, and the center rupture line 30 of the cover 12, thereby causing the side rupture lines 21, the dividing rupture line 22, and the center rupture line 30 to rupture open.

Figure 7:
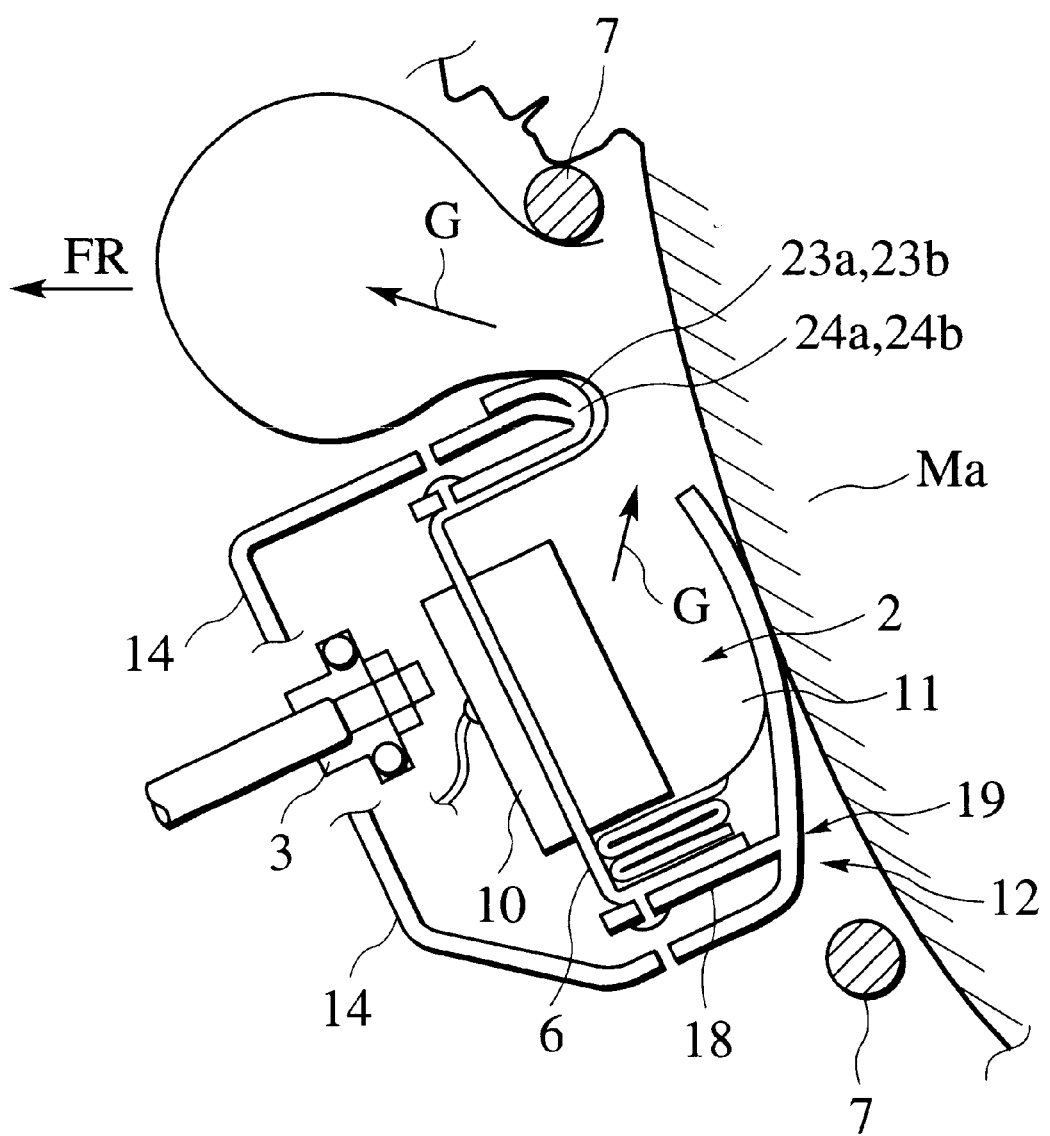
FIG. 7 is a side view that shows the inflation of the bag of FIG. 6.

In this manner, as shown in FIG. 4 the side rupture lines 21, the dividing rupture line 22, and the center rupture line 30 of the cover 12 rupture open, so that the upper lids 23a and 23b separate from one another to the left and right and swing upward about the upper hinges 24a and 24b, respectively, thereby forming the opening 32. As shown in FIG. 7, the bag 11 inflates and deploys (although FIG. 7 shows the condition in which the lower lid 25 has not yet opened). When this occurs, because the upper lids 23a and 23b do not interfere with the rim 7, it is possible for the upper lids 23a and 23b to move further to the front of the vehicle (direction indicated by the arrow FR) than the rim 7. For this reason, when the bag 11 again receives the occupant M, who has moved in response to a secondary shock, there is nothing to block the movement of the bag 11.

As shown in FIG. 6, the upper body Ma, and particularly the chest, of the vehicle occupant M is in proximity to the rim 7 of the steering wheel 1, so that when the inflated bag 4L strikes the chest, the bag 11, which is in the process of inflating, will itself flex and be moved within the space 28 between the steering wheel 1 and the rim 7, which is a location having low resistance.

In the above-noted manner, the bag 11 is not impelled in the direction that would strike at the occupant M and, as shown in FIG. 7, the occupant M is gently stopped, that is, the shock experienced by the occupant M can be absorbed. Additionally, a rebound does not occur in which the occupant M is suddenly moved forward by a secondary shock and then thrown backward again.

Additionally, when the upper lids 23a and 23b are opened, the movement range of the lids 23a and 23b is smaller than that of the lower lid 25, and interference between the upper body Ma of the occupant M, and more particularly the chin Mb thereof, with the upper lids 23a and 23b is avoided by the open part 26. Therefore, even with the chin Mb of the occupant close to the cover 12, there is no danger of the cover 12 causing injury to the occupant M. Because the chin Mb of the occupant is supported by the bag 11, it does not collide with the rim 7 of the steering wheel 1.

Following the above, the bag 11 inflates, and the occupant M is relatively slowly distanced from the rim 7, at which point the inflation of the bag 11 is completed.

Figure 8:
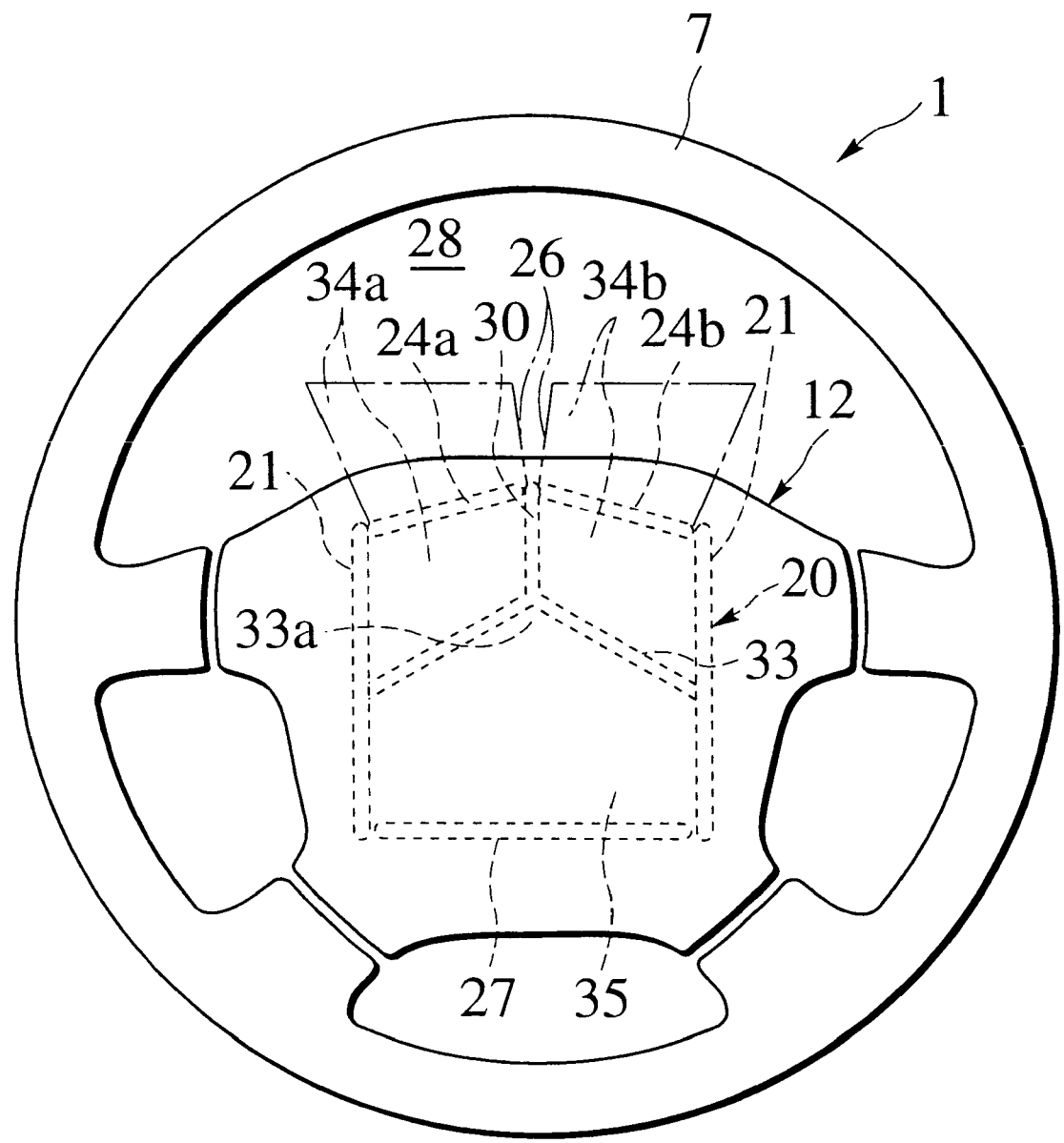
FIG. 8 is a front view that shows the second embodiment of a steering wheel according to the present invention.

FIG. 8 shows the second embodiment of the present invention, the main difference of which with respect to the first embodiment is the shape of the dividing rupture line and the hinges of the upper lids.

More specifically, the dividing rupture line 33 is formed into the shape of a bent straight line, which is bent upward at the left-to-right center part 33a in the direction of the upper hinges 24a and 24b. The upper lids 34a and 34b are formed so as to be contiguous, with the lines of the upper hinges 24a and 24b forming a broken straight line, as viewed front-on, with the center part directed upward and the left and right end points directed downward as shown in FIG. 8. In this embodiment, the angle formed by the two sections of this line is 140°. The reference numeral 35 denotes the lower lid.

According to the above-noted configuration, when the air bag 11 inflates so as to rupture the rupturing part 20 of the cover 12, thereby forming the upper lids 34a and 34b, these lids swing about the upper hinges 24a and 24b, enabling the bag 11 to inflate and deploy outside the cover 12. When this occurs, if a secondary collision causes the occupant M to be received again by the bag, because of the open part 26 that is formed between the upper lids 34a and 34b by the inclination of the upper hinges 24a and 24b, there is further avoidance of an impact of the face Ma, and particularly the chin, of the occupant.

When the upper lids 34a and 34b swing, because the upper lids 34a and 34b, as shown in FIG. 8, do not interfere with the rim 7, it is possible for the bag to move further to the front of the vehicle (direction FR) than the rim 7. In this condition, if the bag 11 receives the occupant M, because there is no obstacle to the movement of the bag 11, the bag 11 itself flexes in response to the movement of the occupant M, thereby gently receiving the occupant, so that the shock that the occupant is subjected to is absorbed softly.

Figure 9:
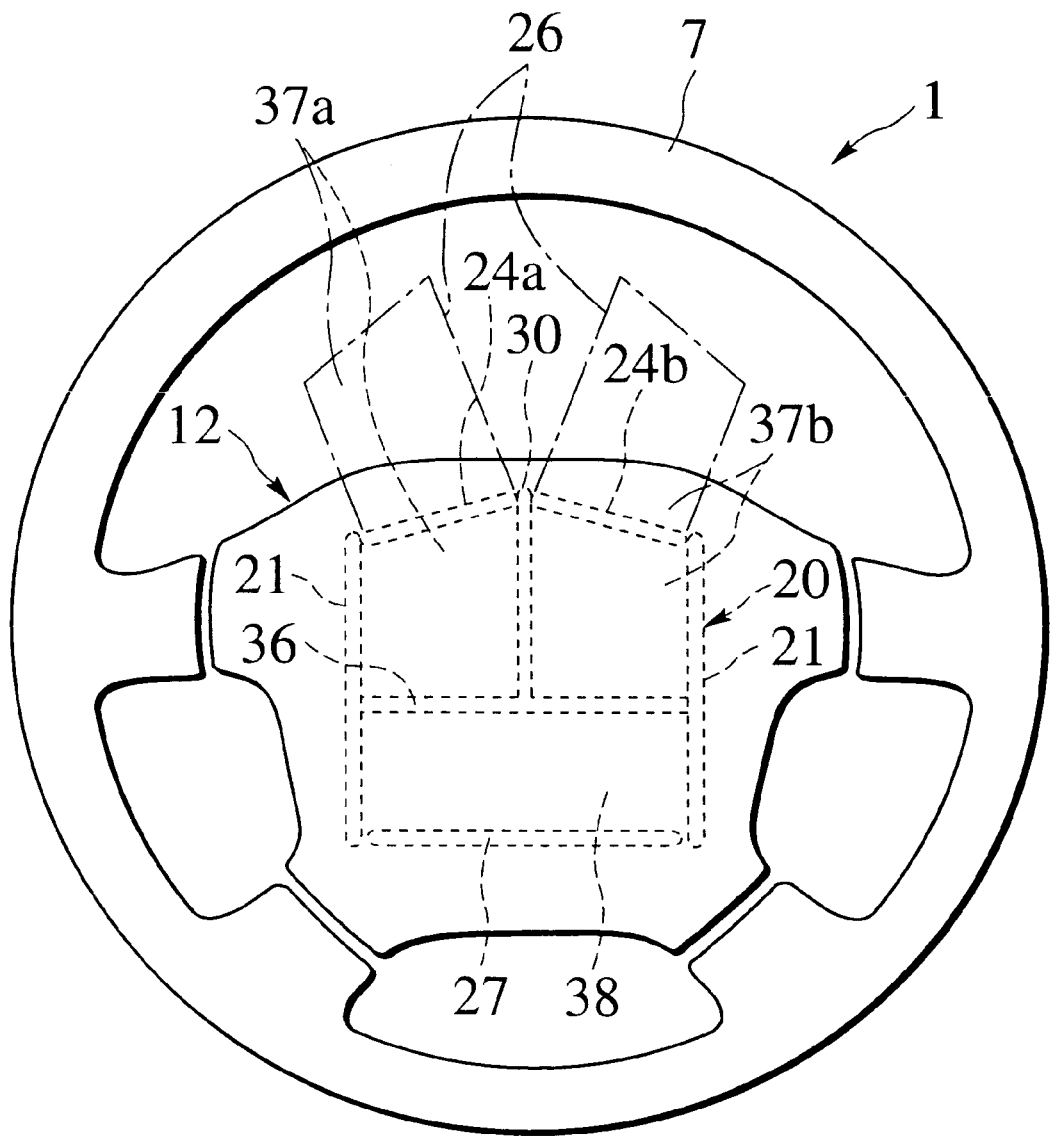
FIG. 9 is a front view that shows the third embodiment of a steering wheel according to the present invention.

FIG. 9 shows the third embodiment of the present invention, the main difference in which with respect to the first embodiment is the shape of the dividing rupture line and the hinges of the upper lids.

More specifically, the dividing rupture line 36 is formed as a substantially straight line. The upper lids 37a and 37b are formed so as to be contiguous, with the lines of the upper hinges 24a and 24b forming a broken straight line, as viewed front-on, with the center part directed upward and the left and right end points directed downward as shown in FIG. 9. In this embodiment, the angle formed by the two sections of this line is 140°. The reference numeral 38 denotes the lower lid.

In the above-noted configuration, when the air bag 11 inflates so as to rupture the rupturing part 20 of the cover 12, thereby forming the upper lids 37a and 37b, these lids swing about the upper hinges 24a and 24b, enabling the bag 11 to inflate and deploy outside the cover 12. When this occurs, if a secondary collision causes the occupant M to be received again by the bag, because of the open part 26 that is formed between the upper lids 37a and 37b by the inclination of the upper hinges 24a and 24b, there is further avoidance of an impact of the face Ma, and particularly the chin, of the occupant.

When the upper lids 37a and 37b swing, as shown by the double-dot-dash line of FIG. 9, because these upper lids 37a and 37b do not interfere with the rim 7, it is possible for the bag to move further to the front of the vehicle (direction FR) than the rim 7. In this condition, if the bag 11 receives the occupant M, because there is no obstacle to the movement of the bag 11, the bag 11 itself flexes in response to the movement of the occupant M, thereby gently receiving the occupant, so that the shock that the occupant is subjected to is absorbed softly.

Figure 10:
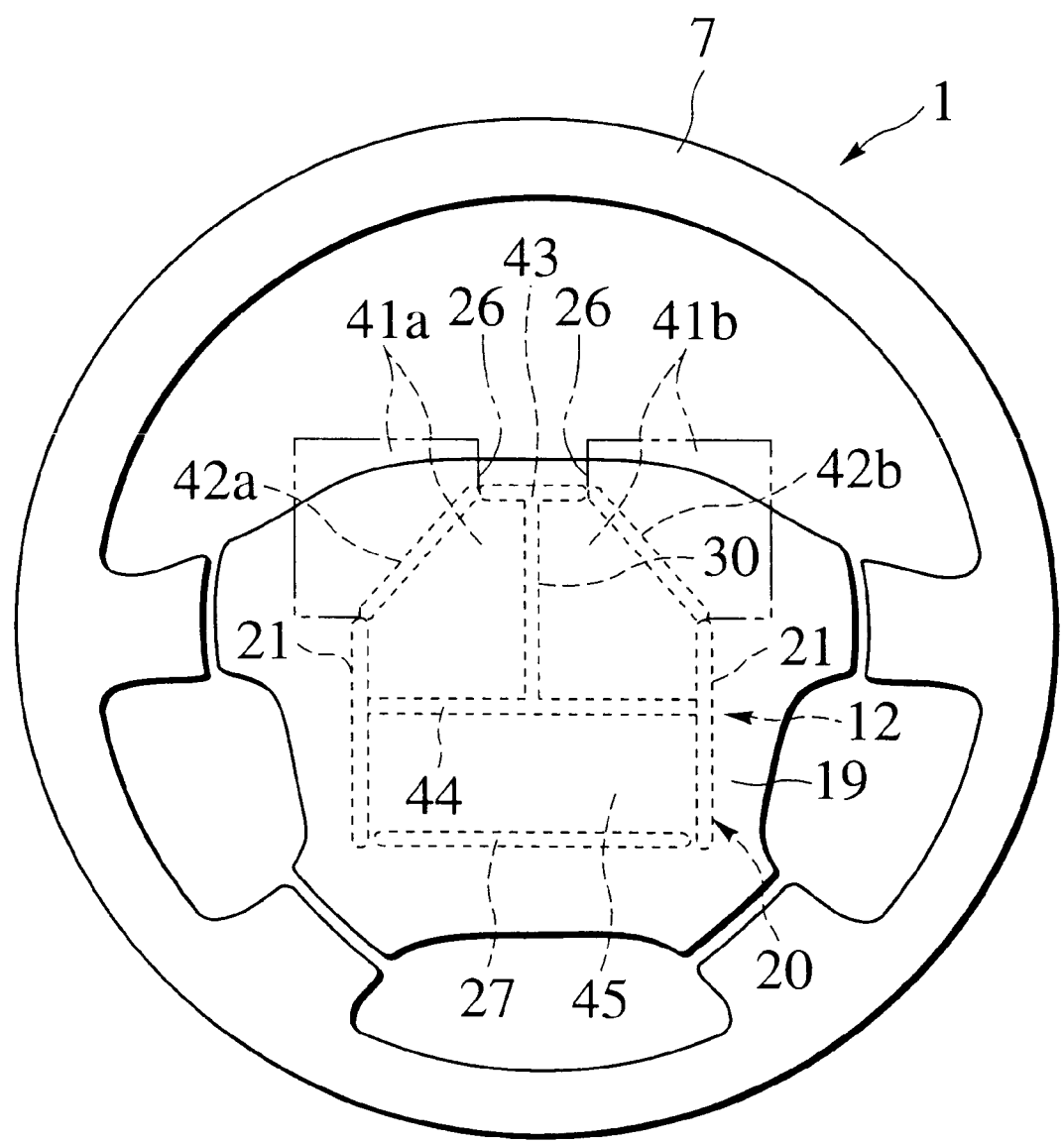
FIG. 10 is a front view that shows the fourth embodiment of a steering wheel according to the present invention.

FIG. 10 shows the fourth embodiment of the present invention, the main difference in which with respect to the first embodiment is the shape of hinges of the upper lids.

More specifically, the upper hinges 42a and 42b of the upper lids 41a and 41b, respectively, are formed independently at the shoulders of the upper lids 41a and 41b at angles of 45° with respect to the left-to-right center line of the front wall 19, starting at positions that are not mutually continuous, as shown in FIG. 10. By adopting this configuration, a new upper rupturing part 43 is formed starting at the upper end of the center rupture line and extending toward the ends of the upper hinges 42a and 42b of the upper lids 41a and 41b. The reference numerals 44 and 45 in this embodiment denote the dividing rupture line and the lower lid.

In the above-noted arrangement, when the air bag 11 inflates so as to rupture the rupturing part 20 of the cover 12, thereby forming the upper lids 41a and 41b, as shown by the double-dot-dash line, at separate positions, these lids swing about the upper hinges 42a and 42b, the area formed as the upper rupturing part 43 having an opening 26. Because of this arrangement, if a secondary collision causes the moving occupant M to be received again by the bag 11, there is further avoidance of an impact of the face Ma, and particularly the chin, of the occupant M.

What is claimed is:

1. A steering wheel for a vehicle, comprising:

a boss which is supported on a steering shaft;

a rim;

a spoke which joins the boss and the rim; and an air bag apparatus, comprising:

a bag, which is folded up; and a synthetic resin cover which covers the bag, which, when the vehicle is subjected to a collision, to support an occupant, is filled with gas so as to be inflated, thereby rupturing the cover;

the cover comprising a side wall that surrounds the periphery of the bag and a front wall that covers an inflation direction of the bag, the front wall having two side rupture lines, on the left and right, a dividing rupture line that joins the two side rupture lines, a center rupture line that extends upwards from the approximate center of the dividing rupture line, and two upper hinges, the two upper hinges being disposed between the side rupture lines and the center rupture line, the side rupture lines, the dividing rupture line, the center rupture line, and the upper hinges defining two upper lids at two locations, wherein the upper hinges mutually cross at an angle less than 180 degrees wherein the dividing rupture line has a pair of straight lines extending from the side rupture lines and a center part between the straight lines, the center part projects from the straight lines toward the upper hinges and, wherein when the cover ruptures open, the side rupture lines, dividing rupture line, and center rupture line rupture, causing each lid to bend and swing about the upper hinge as a moving axis, the dividing rupture line being disposed at a position such that the upper lids do not interfere with the rim.

2. A steering wheel according to claim 1, wherein the upper hinges are joined adjacent to an end of the center rupture line.

3. A steering wheel according to claim 1, wherein the upper hinges cross the center rupture line at an angle less than 90°.

4. A steering wheel according to claim 1, wherein the center rupture line has two end parts that extend toward the upper hinges.

5. A steering wheel apparatus according to claim 1, wherein the center portion of the dividing rupture line comprises a curved line.

6. An air bag apparatus that is installed in a steering wheel of a vehicle, the steering wheel comprising a boss, which is supported on a steering shaft, a rim, and a spoke which joins the boss and the rim, the air bag apparatus comprising:

a bag which is folded up; and a synthetic resin cover which covers the bag, which, when the vehicle is subjected to a collision, to support an occupant, is filled with gas so as to be inflated, thereby rupturing the cover;

the cover comprising a side wall that surrounds the periphery of the bag and a front wall that covers an inflation direction of the bag, the front wall having two side rupture lines, on the left and right, a dividing rupture line that joins the two side rupture lines, a center rupture line that extends upwards from the approximate center of the dividing rupture line, and two upper hinges, the two upper hinges being disposed between the side rupture lines and the center rupture line, the side rupture lines, the dividing rupture line, the center rupture line, and the upper hinges defining two upper lids at two locations, wherein the upper hinges mutually cross at an angle less than 180 degrees, wherein the dividing rupture line has a pair of straight lines from the side rupture lines and a center part between the straight lines, the center part projects from the straight lines toward the upper hinges and, wherein when the cover ruptures open, the side rupture lines, dividing rupture line, and center rupture line rupture, causing each lid to bend and swing about the upper hinges as a moving axis, the dividing rupture line being disposed at a position such that the upper lids do not interfere with the rim.

7. An air bag apparatus according to claim 6, wherein the upper hinges are joined adjacent to an end of the center rupture line.

8. An air bag apparatus according to claim 6, wherein the center rupture line has two end parts that extend toward the upper hinges.

9. An air bag apparatus according to claim 6, wherein the center portion of the dividing rupture line comprises a curved line.

10. A steering wheel for a vehicle, comprising:

a boss which is supported on a steering shaft;

a rim;

a spoke which joins the boss and the rim; and an air bag apparatus, comprising:

a bag, which is folded up and a synthetic resin cover, which covers the bag, which, when the vehicle is subjected to a collision, to support an occupant, is filled with gas so as to be inflated, thereby rupturing the cover;

the cover comprising a side wall that surrounds the periphery of the bag and a front wall that covers an inflation direction of the bag, the front wall having two side rupture lines, on the left and right, a dividing rupture line that joins the two side rupture lines, a center rupture line that extends upwards from the approximate center of the dividing rupture line, and two upper hinges, the two upper hinges being disposed between the side rupture lines and the center rupture line, the side rupture lines, the dividing rupture line, the center rupture line, and the upper hinges defining two upper lids at two locations, wherein the upper hinges mutually cross at an angle less than 180 degrees, wherein upper ends of the upper hinges coincide with an upper end of the center rupture line and, wherein when the cover ruptures open, the side rupture lines, dividing rupture line, and the center rupture line rupture, causing each lid to bend and swing about the upper hinge as a moving axis, the dividing rupture line being disposed at a position such that the upper lids do not interfere with the rim.

* * * * *